Feb. 19, 1957  E. L. SCHLAGE ET AL  2,781,940
FASTENING DEVICE
Filed July 21, 1953  2 Sheets-Sheet 1
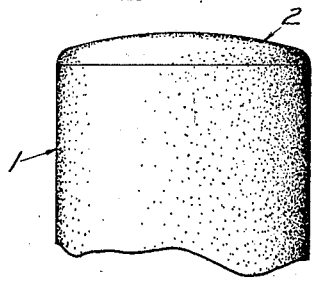
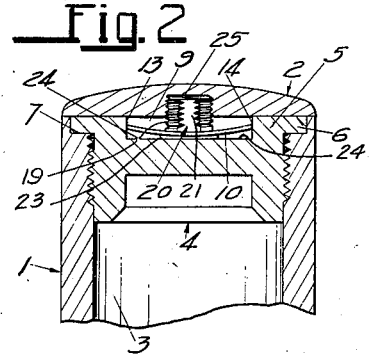
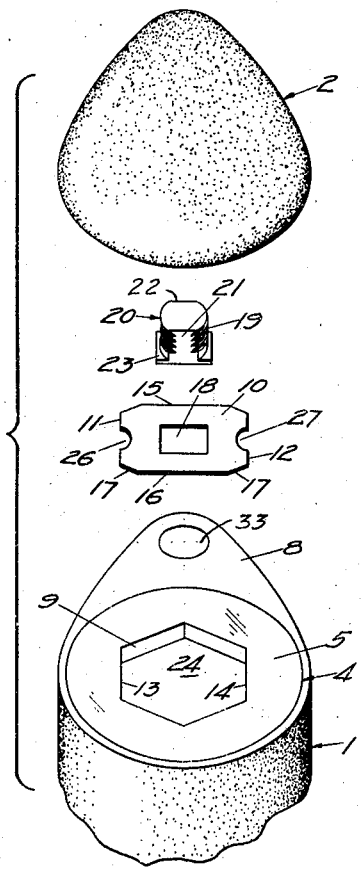
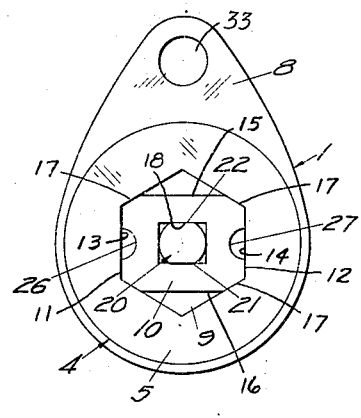
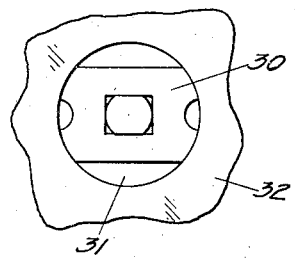
INVENTORS
ERNEST L. SCHLAGE
MARRON KENDRICK
BY
Boyken, Mohler & Beekley
ATTORNEYS Feb. 19, 1957　　E. L. SCHLAGE ET AL　　2,781,940
FASTENING DEVICE
Filed July 21, 1953　　2 Sheets-Sheet 2
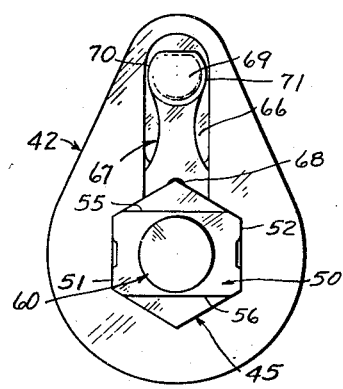
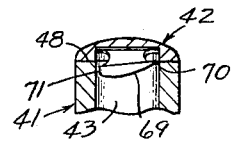
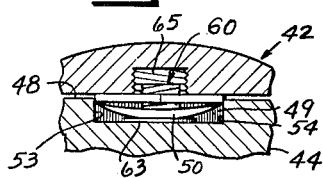
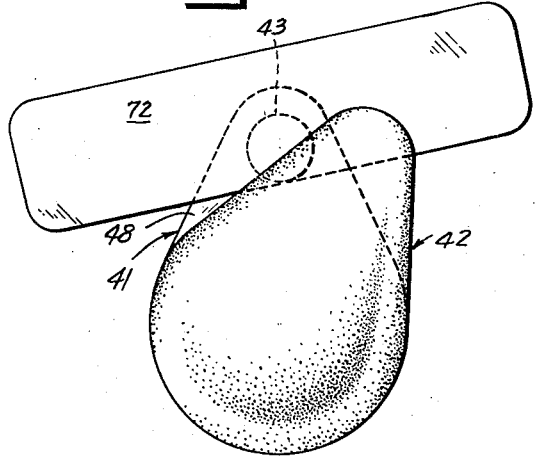
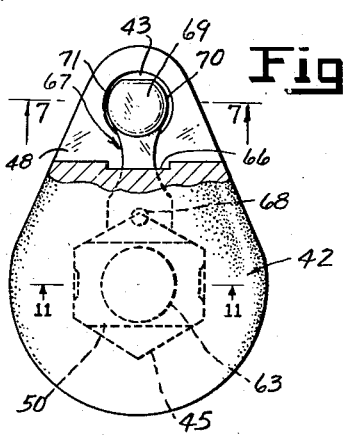
INVENTORS
ERNEST L. SCHLAGE
BY　MARRON KENDRICK United States Patent Office 2,781,940
Patented Feb. 19, 1957

2,781,940

FASTENING DEVICE

Ernest L. Schlage, Burlingame, and Marron Kendrick, Atherton, Calif., assignors to Schlage Lock Company, a corporation Application July 21, 1953, Serial No. 369,286

4 Claims. (Cl. 220—25)

This invention relates to a device for fastening two members together and more particularly to a device for removably securing an element to a body when such body is provided with an outwardly opening recess.

In many instances, it is required to secure an element to a body when no interengaging devices are available except a recess in such body, and when the use of exterior fastening means would mar the finish of the assembled article. In general, examples of this problem are found where it is desired to provide a decorative cover plate or the like over a portion of a body having a functional fitting which it is desirable to hide from view.

As a specific example, the body of a door closer is generally provided with a through bore which is threaded at its opposite ends to threadedly receive plugs for closing said bore and making the same tight. Such plugs are conveniently provided with recesses usually of hexagonal cross-section for receiving the complementary formed working end of a wrench for tightening and loosening the plugs.

Inasmuch as the plugs must be readily removable for servicing the door closer, it is desirable that the same be accessible. However, the functional appearance of the plug is undesirable from an aesthetic standpoint and it is preferable to provide a cover which, in shape, may be made to conform to the lines of the door closer body. It is therefore extremely desirable to provide a fastening means for securing such a cover to the body speedily and effectively without unnecessarily complicating the servicing operation.

The main object of the present invention is the provision of a fastening device for securing a cover or other element to a body in an extremely dependable manner without the use of visible elements of any nature.

Another object of the invention is the provision of a fastening device for securing an element to a body or for securing two members to each other and which device is inexpensive to make and may be speedily installed and removed.

Still another object of the invention is the provision of a fastening device which may be employed for effectively securing two members together without requiring machining or modification of either member except for the provision of a recess in said members.

Another object of the invention is the provision of a fastening device which incorporates locking means for preventing unauthorized disassembly of the connected parts.

Other objects and advantages will be apparent from the following specification and the attached drawings:

Fig. 1 is a fragmentary side elevational view of one end of a door closer in a vertical position showing a cover plate secured to the door closer body.

Fig. 2 is a vertical cross-sectional view through the door closer body showing the invention in use.

Fig. 3 is an exploded view of the cover plate, door closer and the parts of the invention all in their proper relative position before assembly.

Fig. 4 is a top plan view of the door closer with the cover plate removed showing the invention inserted into the hexagonal recess in the head of the plug.

Fig. 5 is a view similar to Fig. 4 showing a modified form of the invention which is adapted to be employed with a body having a cylindrical shaped recess.

Fig. 6, a bottom plan view, is a modified form of the cover plate incorporating a locking device.

Fig. 7 is a vertical cross sectional view through the door closer body and cover as taken along lines 7—7 of Fig. 9.

Fig. 8 is an exploded view the various parts of the fastening device and cover plate.

Fig. 9 is a top plan view of the cover plate fastened to the door closer body with a portion of the cover plate broken away for clarity.

Fig. 10 is a top plan view of the cover plate secured to the body and with the cover plate swung out of registration with the body, illustrating the method of removing the cover plate.

Fig. 11 is a vertical cross sectional view through the fastening device showing the same securing the cover plate and body together.

In detail, the simplest form of the invention is illustrated in conjunction with a door closer having a body 1 over one end of which it is desired to secure a cover plate 2.

As best seen in Fig. 2, the door closer body 1 is provided with a through bore 3 which is closed by means of a conventional plug 4. Plug 4 is screwthreadedly secured in body 1 and is provided with a head 5 including a radially outwardly projecting peripheral flange 6 which is received in a complementarily formed annular seat 7 in body 1. By this structure, the end face 8 of body 1 would normally be visible as would the head 5 of plug 4. In addition, the recess or socket 9 (normally of hexagonal cross section) would also be visible thus marring the appearance of body 1.

For the purpose of securing the cover plate 2 on body 1, a relatively flat section 10 of spring steel is provided which is substantially rectangular in shape and having a pair of opposite end edges 11, 12 which are adapted to abut a pair of opposite sidewalls 13, 14 of the hexagonal recess 9 (Fig. 4).

As best seen in Fig. 2, the length of the flat spring 10 between end edges 11, 12 is slightly greater than the spacing between sidewalls 13, 14 so that said spring 10 becomes slightly bowed toward the bottom of recess 9 when said spring is pressed into said recess.

The lateral side edges 15, 16 of spring 10 are preferably spaced apart a slightly greater distance than the length of the sidewalls of the recess 9 and the corners of the spring are cut off as at 17 so that the same are complementary to the junctures of sidewalls 13, 14 and the adjacent sidewalls of recess 9.

Spring 10 is provided with a central opening 18, preferably rectangular, which is adapted to receive therethrough the threaded shank 19 of a bolt 20.

Shank 19 of bolt 20 is relieved at diametrically opposite points to produce a pair of opposite flat faces 21, 22 so that said shank is snugly received through rectangular opening 18 in spring 10. By this structure, relative rotation between bolt 20 and spring 10 is prevented.

Bolt 20 is provided with a head 23 which is preferably relatively thin so that the assembled spring and bolt may be inserted into recess 9 with the bolt head 23 leading as seen in Fig. 2 and with said spring 10 relatively close to the bottom 24 of recess 9.

The shank 19 of bolt 20 is preferably long enough so that it extends a short distance outwardly beyond the end face 8 of body 1.

The cover plate 2 is provided with a threaded hole 25 in which the end of shank 19 is adapted to be received for securing the cover plate 2 to said shank.

In operation, when it is desired to install cover plate 2, the shank 19 of bolt 20 is first passed through opening 18 and the spring 10 is then pressed into recess 19 with the bolt head 23 leading. At the same time the spring 10 is bowed toward the bottom 24 of recess 9 so that the opposite end edges 11, 12 frictionally grip the opposed sidewalls 13, 14 of said recess.

When the spring 10 is securely in place, it cannot be withdrawn by a direct pull in a direction axially of recess 9 and the cover plate 2 may then be turned on shank 19 until the said cover plate is in abutment with the end face of body 1. It is extremely important, especially in the case of cover plates having noncircular contours, that the cover plate be rotatable on bolt 20 into tight face to face engaging relationship with the body and, in addition, that the cover plate be in exact registration with the body when so tightened. By the present invention, these results are assured because of the yieldable connection between the cover plate and the body.

In this connection, it will be understood that the cover plate 2 may be swung through a relatively large arc while said plate is in face to face engagement with said body. In other words, the bolt 20 may be displaced slightly in an axial direction during the tightening operation against the yieldable resistance of the spring 10. When the recess in the body is of hexagonal or square contour, it will be noted that an additional adjustment is possible by shifting the spring 10 to abut different pairs of sides. Thus, only a 60 degree rotation of the cover plate after it is in engagement with the body is all that is required to achieve registration. By shifting the bolt 20 180 degrees relative to the spring 10 a further reduction in the required rotation of the cover plate may be achieved.

It will be understood that the cover plate 2 may take any desired shape and in some cases may be an ornament of different material from the body.

To remove the cover plate 2, it is merely necessary to unscrew the same from shank 19, and then spring 10 may be removed along with bolt 20. To facilitate removal of spring 10 the same may be relieved adjacent the opposite end edges 11, 12 to provide a pair of oppositely outwardly opening notches 26, 27 which may be engaged by the bit of a screwdriver or other tool so that the spring is readily twisted out of engagement with the sidewalls of the recess.

In the case of the particular door closer illustrated, it will also be noted that a hole 33 is provided in the end face 8 of the door closer body 1. This hole 33 is the end of a bore through which a screw driver or other tool may be inserted to adjust the internal mechanism (not shown) of the door closer. It will be seen that this hole 33 is also covered by the cover plate 2.

Although the above structure has been described in connection with a hexagonal shaped recess, it will be obvious that the spring 10 may take different shapes to suit whatever type of recess is encountered. For example, as illustrated in Fig. 5, a spring 30 may be formed complementarily to a circular recess 31 in body 32 if desired, although the embodiment of Figs. 1–4 is preferred.

Figs. 6–11 illustrate another form of the invention which, though more complicated, is easier to use, more foolproof in operation and which does not require the manipulation of the relatively small bolt and spring. In addition, the device of Figs. 6–11 incorporates a locking device which prevents unauthorized removal of the cover plate, but which permits the cover plate to be speedily removed with the aid of a special tool.

As seen in Figs. 7, 9, 11 a door closer body 41 is illustrated which is identical to door closer body 1 of Figs. 1–4 and includes a plug 44 in the head of which is an outwardly opening recess or socket 49. A somewhat smaller hole 43 is provided in the narrowed portion of the body through which adjustment of the internal mechanism may be effected as above described.

A cover plate 42 is provided which is similar in contour to cover plate 2 above described, but which is modified in certain respects to be explained.

A flat spring 50 (Figs. 8, 11) is provided which is similar to spring 10 in that it is bowed intermediate the opposite end edges 51, 52. However, in this case the spring 50 may be bowed between the lateral side edges 55, 56 (Fig. 8) so that the flat spring 50 is actually dished.

A bolt 60 is formed with a pair of opposite flat faces 61 on its shank 59 so as to be received through a central aperture 58 in spring 50 and which aperture is complementary in shape to the cross section of the shank of bolt 60. Shank 59 is threadedly received in a hole 65 in cover plate 42.

In addition, in this embodiment of the invention, a spacer 45 is provided for positively spacing the spring 50 from the cover plate 42. This spacer (Figs. 6, 8, 11) is preferably a relatively thin nut having a central aperture 46 complementary to the cross section of shank 59 of bolt 60 for mounting the same on said shank. The outline of nut 45 may be hexagonal, square or any other desired shape, but preferably noncircular. The recess 49 is preferably complementary in cross section to said nut.

As best seen in Fig. 11, when the bolt, spring and nut are assembled with shank 59 threadedly secured in hole 65 in cover plate 42, the assembly may be placed over the end face 48 of body 41 with the nut 45 at least partially received in the recess 49. The opposite end edges 51, 52 of spring 50 are thus in a position to frictionally engage the adjacent sides 53, 54 of recess 49. Upon rotation of cover plate 42 in a direction to screw shank 59 of bolt 60 into hole 65 in said cover plate, it will be apparent that the spring 50 will be compressed between nut 45 and head 63 and tend to flatten out so that the opposite end edges 51, 52 of spring 50 move oppositely outwardly into firm frictional engagement with the sides of the recess 49. At the same time, the cover plate 42 will move toward the face 48 of body 42 until it is in engagement with the same. It should be noted at this point that the nut 45 not only acts as a spacer to insure that the opposite end edges of spring 50 engage the sides of the recess at points spaced inwardly from the open end of the same, but nut 45 also prevents bolt 60 from turning. In other words, the relatively thin spring 50 is not relied on to hold the bolt 60 against rotation but merely to prevent axial movement of the same in a direction outwardly of the recess 49.

Use of the nut 45 also permits the bolt to be assembled with the spring at the factory and there is never any necessity for completely removing the bolt from the cover plate.

It is pertinent to note that the free length of the spring between the end edges 51, 52 may, in this case, be made slightly less than the spacing between the sides of recess 49 that they engage, because the compression of the spring, when the bolt 60 is screwed into cover plate 42, is relied on to spread said edges into tight frictional engagement with the sides 53, 54 of the recess. Thus, when the cover 42 is rotated to loosen it from bolt 60, the resiliency of spring 50 will permit the opposite edges 51, 52 of the spring to disengage the sides of the recess and the entire assembly may be readily withdrawn as a unit from the recess.

Figs. 6–11 also illustrate a locking device to prevent unauthorized removal of the cover plate. It will be understood, however, that this locking device also lends itself to use with the fastening device of Figs. 1–4.

As best seen in Figs. 6, 8, the cover plate 42 is provided with an elongated, generally rectangular recess 66 which is adapted to receive an elongated resilient stop element, generally designated 67. Stop element 67 may be formed from a flat section of spring steel and is fixed at one end by means of screw 68 to the cover plate 42. The opposite end of member 67 is free and is formed to provide a knob 69 which is adapted to be received in the adjustment hole 43 in the body 41 when the cover 42 is superposed in the face 48 of said body (Fig. 9).

The outwardly directed side of knob 69 is biased transversely of member 67 as seen in Fig. 7, to provide a relatively sharp edge 70 which is about on line with the face 48 of body 41 when cover plate 42 is in face to face engagement therewith. The opposite edge of knob 69 is formed to provide a shoulder 71 which is spaced outwardly from the edge 70 relative to the cover plate 42.

As seen in Fig. 9, upon clockwise movement of the cover plate 42 about the bolt 60 the knob 69 will ride up on the adjacent face 48 of body 41 against the inherent resiliency of member 67 thus permitting continued rotation in a clockwise, or tightening direction. However, upon attempting to rotate cover plate 42 in a counterclockwise, or loosening, direction, the shoulder 71 strikes the adjacent wall of hole 43 preventing such rotation. In this manner, unauthorized removal of the cover plate 42 is positively prevented.

When authorized removal of the cover plate 42 is desired, the same is rotated clockwise to about the position of Fig. 10 at which position the knob 69 is free from the body 41. A relatively thin planar element 72 (Fig. 10) of sheet material may then be forced between the cover plate 42 and the face 48 of body 41 so that said element urges the knob 69 inwardly of cover plate 42 and up on the upper side of said element 72. With the element 72 in this position, the cover plate 43 may then be rotated counterclockwise past the hole 42. Rotation of cover plate 42 may thus be continued until the spring 50 is permitted to expand sufficiently to disengage edges 51, 52 from the sides 53, 54 of recess 49 at which point the cover plate may be removed.

The hole 43 in the body 41 serves a particular function in the case of a door closer, but it will be apparent that any outwardly opening recess in the body will cooperate with stop member 67 to provide a locking means.

In the case of a cover plate of noncircular shape, it should be noted that the stop member 67 automatically registers the cover plate with the contour of the body on which it is used.

The above detailed description is not to be taken as restrictive of the invention as various modifications in design will occur to those skilled in the art without departing from the spirit of the invention.

We claim:

1. In combination with a body provided with an outwardly opening recess wherein said recess is polygonal in cross sectional contour and provided with a pair of opposed parallel sidewalls, mounting means for releasably securing an element to said body, said means comprising: a relatively flat spring having a pair of opposite parallel side edges spaced apart a distance slightly greater than the width of said recess between said sidewalls whereby said spring becomes slightly bowed toward the bottom of said recess when pressed into the latter between said sidewalls, thereby resisting withdrawal from said recess, said flat spring being centrally apertured for receiving the shank of a bolt therethrough whereby the head of said bolt may be positioned between said flat spring and the bottom of said recess with the shank of said bolt extending axially outwardly of said recess, for screw threadedly receiving said element thereon.

2. Mounting means for releasably securing an element to a body provided with an outwardly opening recess wherein said recess is polygonal in cross sectional contour and provided with a pair of opposed parallel sidewalls, said means comprising: a relatively flat spring having a pair of opposite parallel side edges spaced apart a distance slightly greater than the width of said recess between said sidewalls whereby said spring becomes slightly bowed toward the bottom of said recess when pressed into the latter between said sidewalls, thereby resisting withdrawal from said recess, said flat spring being centrally apertured for receiving the shank of a bolt therethrough whereby the head of said bolt may be positioned between said flat spring and the bottom of said recess with the shank of said bolt extending axially outward of said recess, for screwthreadedly receiving said element thereon, said spring being relieved at a point along one of said opposite parallel side edges to provide a notch adapted to receive a tool for withdrawing said spring from said recess.

3. Mounting means for releasably securing an element to a body provided with an outwardly opening recess of hexagonal cross section to provide pairs of opposed parallel sidewalls, said means comprising: a generally rectangular relatively flat spring having a length slightly greater than the width of said recess between said pairs of sidewalls whereby said spring becomes slightly bowed toward the bottom of said recess when pressed into the latter between one of said pairs of sidewalls thereby resisting withdrawal from said recess, said spring having a width greater than the width of said sidewalls and having its corners formed complementarily to the junctures of adjacent sidewalls and adapted to engage said junctures.

4. In combination, a body having first and second outwardly opening recesses in one side thereof, a flat spring extending between opposite sides of one of said recesses and bowed intermediate two of its opposite edges in a direction away from the open end of said first recess with said edges in frictional engagement with said opposite sides, a cover plate adapted to be secured to said one side of said body, a bolt having its shank in threaded engagement with said closure and secured to said spring at a point intermediate said edges, a stop element carried by said closure and adapted to be received in said second recess when said cover plate and said one side of said body are in substantially face to face relationship, said element being biased to permit swinging said cover plate in one direction about said bolt and to prevent swinging said cover plate in the opposite direction when said stop element is received in said second recess, whereby said cover plate may be tightened on said body when said stop element is in said recess preventing loosening of said cover plate.

References Cited in the file of this patent
UNITED STATES PATENTS

| | | |
|---|---|---|
| 1,490,854 | Rutter | Apr. 15, 1924 |
| 1,593,939 | Holstein | July 27, 1926 |
| 1,837,346 | Thomas | Dec. 22, 1931 |
| 2,125,419 | Birk | Aug. 2, 1938 |
| 2,249,381 | Gustafson | July 15, 1941 |
| 2,269,198 | Hicks | Jan. 6, 1942 |
| 2,346,181 | Overend | Apr. 11, 1944 |
| 2,367,909 | Wanner | Jan. 23, 1945 |
| 2,441,514 | Schorr | May 11, 1948 |